United States Patent [19]

Shirane

[11] Patent Number: 4,820,062
[45] Date of Patent: Apr. 11, 1989

[54] BEARING FOR STEERING WHEEL SHAFT OF VEHICLES

[75] Inventor: Takashi Shirane, Yokohama, Japan

[73] Assignee: Nippon Thompson Co., Ltd., Tokyo, Japan

[21] Appl. No.: 230,604

[22] Filed: Aug. 10, 1988

[30] Foreign Application Priority Data

May 6, 1988 [JP] Japan .................. 63-108954

[51] Int. Cl.⁴ .......................................... F16C 33/60
[52] U.S. Cl. .................... 384/486; 384/570; 384/582
[58] Field of Search ............. 384/486, 570, 582, 484, 384/560, 536

[56] References Cited

U.S. PATENT DOCUMENTS

| 2,069,569 | 2/1937 | Young | 384/570 |
| 3,890,854 | 6/1975 | Pitner | 384/582 |
| 3,923,351 | 12/1975 | Frost | 384/486 |
| 4,708,498 | 11/1987 | Labedan et al. | 384/582 |

Primary Examiner—Lenard A. Footland
Attorney, Agent, or Firm—Rogers & Killeen

[57] ABSTRACT

A bearing for the steering wheel shaft of a vehicle comprises a number of needle-like rollers, a retainer retaining the needle-like rollers, a cylindrical race member circumscribing the needle-like rollers, and an elastic cylindrical member fitted over said cylindrical race member. The cylindrical race member has a generally S-shaped split formed over the full axial length thereof and extending more or less obliquely with respect to the axis of the race.

Unlike the prior art cylindrical race member having an obliquely extending straight slit, the cylindrical members, even if in a great number, are stored in a single container, they do not catch one another through the slits just like a puzzle ring.

Further due to the specific S-shaped configuration of the slit, the cylindrical race member, even when in the assembled state, the opposing side edges of the slit are brought into abutting engagement, a narrow slit is still kept open at and along the intermediate portion of the slit so as to prevent the opposing side edges of the slit from riding on each other to form a superimposed edge portion.

2 Claims, 2 Drawing Sheets $R > \dfrac{B}{2}$

BEARING FOR STEERING WHEEL SHAFT OF VEHICLES

BACKGROUND OF THE INVENTION

1. Field of the Invention

The present invention relates to a steering wheel shaft bearing for vehicles for rotatably supporting the steering shaft to a steering column.

2. Description of the Prior Art

Heretofore was inherent in the bearing of this type a problem that due to some machining errors taking place on the inner peripheral surface of a steering column to which the bearing is fitted and the dimension in diameter of the steering shaft, the bearing gap sometimes becomes excessively greater so as to cause noise due to vibration of the vehicle or the bearing gap becomes excessively small thereby to increase the steering torque and thus resulting in difficulty of keeping equilibrium between the occurrence of back-lash noise and the increase in torque.

To solve the problem inherent in the prior art technology was proposed an invention such as disclosed by Japanese Patent Application No. 88104-1979, wherein use is made, in retaining a plurality of needle-like rollers for the steering wheel shaft of a vehicle, of a cylindrical race member circumscribing the needle-like rollers and having a straight split formed and extending obliquely through and along the whole axial length thereof so as to improve operability and sealing performance of the bearing.

However, the above-proposed invention has been found to have the following disadvantages due to the specific construction of the cylindrical race member.

The cylindrical race member of the prior art technology has a generally C-shaped cross section with an obliquely extending straight slit so that if a number of the cylindrical race members are stored in a container or the like, they have normally open slits which are liable to catch one another through the opening slits just as in the case of puzzle rings so that before the use, they must be separated beforehand from one another, thus unavoidably requiring extra labour and excessive working steps in the manufacture of the bearing units.

Further, an obliquely extending straight slit was provided in the prior art cylindrical race member, therefore when, in practical use, the opposing edges of the slit are brought into contact either on the whole length of each of the opposing edges or only at the intermediate portions thereof, the opposing edges are forced to displace from each other in the axial direction of the cylindrical race member, such a sidewise displacement in turn resulting in poor dimensional accuracy of the race member.

Furthermore, when one of the opposing edges runs on the other when the race member has been assembled with the steering wheel column, the thus superimposed portion forms an undesirable level difference, resulting in rapidly enhanced torque of the bearing.

SUMMARY OF THE INVENTION

It is an object of the present invention to overcome the above-mentioned disadvantages, namely, inherent in the prior art race member under any operating conditions with the performance of the steering wheel bearing being not deteriorated, yet providing a steering wheel bearing for a vehicle having less rolling resistance at low costs.

The present invention is therefore to provide, as one of the embodiments, a bearing structure adapted to be inserted between the steering wheel shaft and the steering wheel column of a vehicle, said bearing comprising a number of needle-like rollers, means for retaining said needle-like rollers, a thin-walled cylindrical race member circumscribing said needle-like rollers, and an elastic cylindrical member fitted on said cylindrical race member and consisting of a cylindrical portion positioned outwardly of said cylindrical race member and inwardly directed flange portions at the opposite ends of said cylindrical portion, which is characterized in that said cylindrical race member has a cylindrical shape with a C-shaped cross section and a generally S-shaped split formed along and extending through the full axial length thereof.

The present invention further provides, as another embodiment, a bearing structure as stated in the above first embodiment but it is further featured in that said generally S-shaped slit is so formed in said cylindrical race member that even when the facing opposite edges of the slit have been brought into abutting engagement, a narrow slit is still left open at and along the intermediate portion of the slit so as to present the opposing side edges of the slit from riding on each other to form a superimposed edge portion.

Thus, according to the present invention can be eliminated the drawbacks of the prior art bearing units, while at the same time improving the handling and performance thereof.

BRIEF DESCRIPTION OF THE DRAWINGS

The present invention will now be described hereinbelow with reference to the attached drawings, wherein.

DESCRIPTION OF THE PREFERRED EMBODIMENTS

Figure 1:
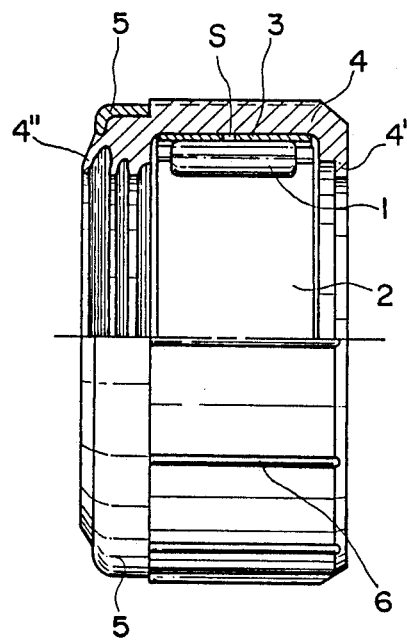
FIG. 1 is a longitudinally cross-sectional view of the bearing according to the present invention, mounted on a steering wheel shaft.

Referring to the accompanying drawings, the construction of the present invention will be explained hereinbelow:

Referring to FIG. 1, the bearing of the present invention that has been fitted in the upper end of a steering column (not shown) and rotatably supporting a steering wheel shaft comprises a number of needle-like rollers 1 circumscribing said steering wheel shaft retainer member 2 retaining the needle-like rollers 1, a cylindrical race member 3 circumscribing said needle-like rollers 1, and a cylindrical elastic member 4 made of rubber or the like material fitted on said cylindrical race member 3 in a circumscribing relation therewith.

Figure 2:
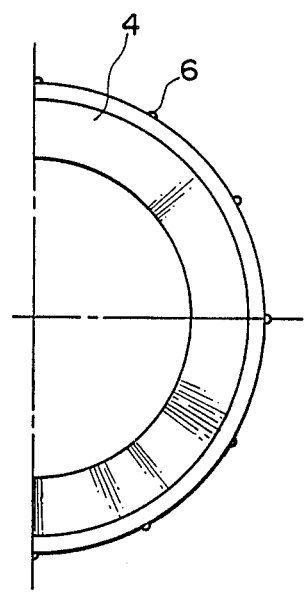
FIG. 2 is a traversally cross sectional, rough sketch of the bearing shown in FIG. 1.

As shown in FIGS. 1 and 2, a small number of projecting ridges 6 are provided in equi-spaced parallel relation with one another on the peripheral surface of axially extending elastic cylindrical member 4 which may or may not be provided.

In operation, the needle-like rollers 1 each are kept in direct contact with a portion of the outer peripheral surface of the steering wheel shaft.

The needle-like rollers 3, the retainer member 2 and the cylindrical race member 3 are made into a bearing assembly in such a manner that one of the flange portions of the elastic cylindrical member is firstly outwardly deformed and then the cylindrical race member 3 incorporating the needle-like rollers 1 with the retainer member 2 is fitted in the inner surface of the cylindrical portion thereof, and this bearing assembly as a whole is forced into and fixed within a steering wheel column. Then, the steering wheel shaft is fitted to the bearing fixed within the steering wheel column such that the cylindrical portion of the elastic cylindrical member 4 is forced into the steering column, thereby elastically deforming it radially and inwardly to compress the internally fitted cylindrical race member 3 in the radial and inward direction. The cylindrical race member 3 has an S-shaped split S so that the cylindrical race member 3 is forced to reduce its diameter within a limit of the gap G of said split S. Therefore, the neelde-like rollers 1 that are kept in an inscribed relation with the race member 3 are brought into contact with the rolling surface of the steering wheel shaft with the diameter of the circular profile of the assembled rollers 1 being reduced.

Such a contact mode as realized by the present invention is of elastic and flexible nature due to the presence of the cylindrical race member 3 and the elastic cylindrical member 4, thereby enabling to eliminate the formation of not only an excessively wide but also an excessively narrow gap therebetween, thus capable of preventing the occurance of back-lash noise as well as enhanced torque.

Further, the split of the race member 3 is provided in the form of a generally S-shape, preferably extending more or less obliquely relative to its longitudinal axis so that the position of contact between the split and each of the needle-like rollers is progressively transferred from one end to the other of the slit and thus the needle-like rollers 1 can smoothly roll on the inner surface of the race member in spite of the presence of the split S.

The preferred embodiments of the present invention will now be explained in details hereinbelow, referring to the accompanying drawings:

Referring to FIG. 1, a thin-walled cylindrical race member 3 (FIG. 3) having a generally C-shaped cross section and a generally S-shaped, single slit S extending over its full axial length is fitted within an annular groove provided on the inner peripheral surface of an elastic cylindrical member 4 and within the thus fitted cylindrical race member 3 is then inserted a bearing assembly consisting of a plurality of needle-like rollers 1 supported by a retainer member 2 in such a manner as to provide a circular profile as seen in a cross section so that respective rollers are arranged in an inscribed relation with the inner surface of the cylindrical race member 3.

Figure 3:
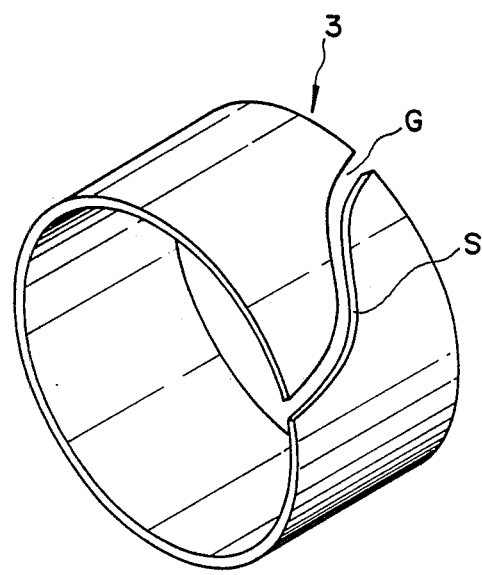
FIG. 3 is a perspective view of a cylindrical race member employed in the present invention.
Figure 4:
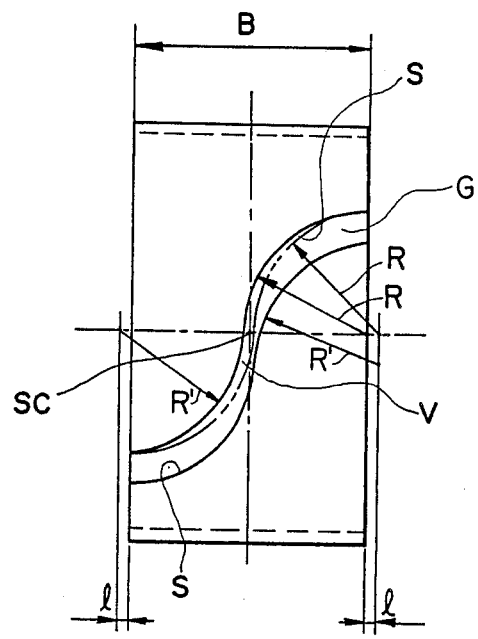
FIG. 4 is a side view of a cylindrical race member having a generally S-shaped slit according to one of the embodiments of the present invention.

A metallic ring 5 secured onto one end of the elastic cylindrical member 4 shown in FIG. 1, serves as a reinforcing ring for conveniently fitting and tightly securing the bearing assembly into a steering wheel column, while as shown in FIGS. 3 and 4, the cylindrical race member 3 is made of a thin-walled metal or a hard synthetic resin and provided with a generally S-shaped slit S more or less obliquely extending over the whole longitudinal length thereof.

The elastic cylindrical member 4 consists of a cylindrical portion 4 to be fitted on the cylindrical race member 3, and opposing flange-like seal portions 4', 4" projected radially inwardly from the opposite ends of the cylindrical portion 4. The inside diameter of each of the flange-like seal portions is made smaller than the diameter of the circular profile that is formed by the rollers assembled within the cylindrical race member but is made slightly greater than the outside diameter of the steering wheel shaft on which the respective rollers slidably contact so as to prevent the assembly of the needle-like rollers 3 and retainer 4 from moving axially outwardly the bearing, while at the same time, forming a sealing gap between the assembly and the outer peripheral surface of the steering wheel shaft to prevent not only leakage of grease from within the bearing but also entry of foreign materials into the bearing.

In FIG. 1, the seal lip 4" consisting of triplet flanges is specially designed to enhance the above-mentioned sealing effect.

Further, the bearing assembly of the cylindrical race member 3 with the respective rollers being retained by the retainer member 2 and kept in contact therewith on the inner surface thereof is snugly fitted into the annular groove formed on the inner peripheral surface of said elastic cylindrical member 4, therefore the respective rollers can be precisely aligned in the axial direction of the steering wheel axis, while preventing any skewing of the assembled bearing and reducing rotation resistance thereof.

As shown in FIG. 4, the configuration of S-shape of the slit of the cylindrical race member 3 of the present invention is so formed that by dividing the S-shape at the center point thereof into two sectioned arcs, each arc having a radius R that is longer than ½ of the full longitudinal length of the cylindrical race member but any point falling on its arc cannot go over the imaginary center point SC of the whole length of slit to the other side.

With such a configuration of the S-shaped slit as defined above, even if the opposing side edges thereof have been brought into abutting engagement, as illustrated with the dotted line in FIG. 4, an S-shaped narrow gap G may be formed at the intermediate region of the whole length of the slit and between the opposing side edges so as to prevent the opposing side edges running on the other at that region after the cylindrical race member with the needle-like rollers has been assembled with the steering wheel column.

Further, it should be noted that an S-shaped configuration as such gives rise to less possibility of overlapping of the opposing side edges of the slit as compared with such an obliquely extending straight as adopted in the prior art bearing unit.

The distance of the gap G to be formed between the S-shaped slit S may vary dependent on the size of a particular bearing but preferably be within the ratio of the outer diameter of cylindrical race member with the gap in the order of 26mm/4mm as determined in the unconfined state of the cylindrical race member.

Referring to the embodiment of FIG. 4, where is shown a cylindrical member having a longitudinal length B of about 17.4 mm, the sectioned arcs each are depicted with a radius R' of about 9 mm at a center point located a distance l of about 1.4 mm outside the relevant outer side edge O.

As the cylindrical race member 3 has such an S-shaped slit as extending the whole axial length of the cylindrical race member, preferably more or less obliquely relative to the longitudinal axis thereof, the opposite side edges of the slit S have been brought into abutting engagement under a greater bearing load in operation, an elongated gap V is formed along the intermediate region of the slit S with the remaining region thereof being kept in abutting engagement while preventing the end portions of the slit from being deflected outwardly.

Figure 5:
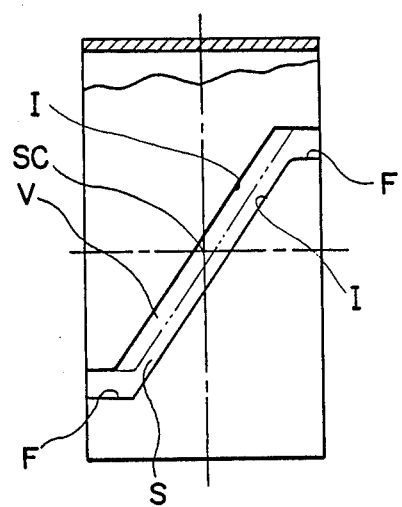
FIG. 5 is a side view of a second embodiment of the cylindrical race member employed in the present invention.

FIG. 5 is a side view of the second embodiment of the present invention, providing a further modified slit configuration of the cylindrical race member, wherein the slit S consists of opposing flat or horizontal end portions F and an intermediate obliquely extending straight portion I connecting said opposing flat end portions F. In this embodiment, if the flat portions F had not been provided, the slit S would have become the same as an obliquely extending straight slit that is the subject matter of the prior art steering wheel bearing where if the opposing straight side edges of the slit have been brought into contact under an excessive bearing load, the opposing side edges are liable to contact with each other only at and along the intermediate portion of the straight slit, while the opposing end portions, the opposing side edges are liable to deflect outwardly relative to each other.

On the other hand, according to the second embodiment of the present invention, even if at the opposing end portions of the slit, the opposing side edges are forced to be brought into contact with each other, a straight gap V as shown with the dotted line in FIG. 5 is always provided with the opposing side edges only of the flat portions F having been brought into contact with each other, while preventing these portions to be deflected outwardly relative to each other thus keeping the accurate performance of the cylindrical race member. Namely, in the present second embodiment, the opposing side edges at the end portion of the slit each are formed as a flat portion extending in parallel to the longitudinal axis of the cylindrical race member so that even when the opposing side edges of the slit have been brought into abutting engagement, the opposing side edges at the flat portions of the slit are not liable to be displaced nor deflected outwardly to each other.

Moreover, due to such a simple configuration of the slit as consisting of straight side edges only, the working of the slit on a cylindrical race member is very simple.

Figure 6:
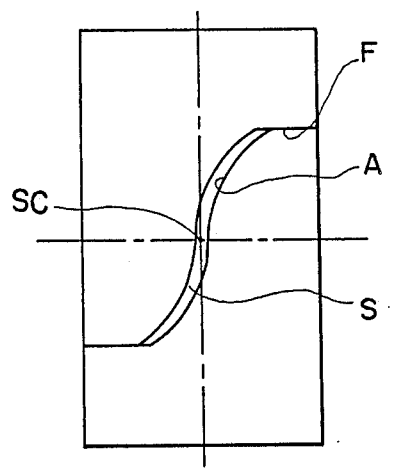
FIG. 6 is a side view of a third embodiment of the race member according to the present invention.

The third embodiment of the cylindrical race member according to the present invention is illustrated in FIG. 6, where the opposing side edges at each of the end portions of an S-shaped slit have been brought into abutting engagement. This embodiment is a combination of the slit configurations of the first and second embodiments shown in FIGS. 4 and 5, respectively, so that the opposing side edges of the opposing end portions of the slit each are formed as being flat, while at and along the intermediate portion, the opposing side edges each are formed as curved line consisting of two sectioned arcs A, thereby preventing the lateral displacement or outward deflection of the opposing side edges.

It should be noted that in each of the foregoing three embodiments, the configuration of the slit may take a mirror imaged S shape.

Since the bearing of the present invention constructed as described above is a needle-like roller bearing provided with an elastic cylindrical member 4 and a cylindrical race member 3 fitted in the elastic cylindrical member 4 and having a generally S-shaped split S, it can elastically support the steering shaft with respect to the steering wheel column and prevent not only the occurrence of back-lash noise but also the increase of steering torque which would result from excessively large or excessively small gap under vibration of the vehicle.

Further as the cylindrical race member 3 is formed in a cylindrical shape with a thin material sheet, while on the circumferential surface thereof is formed an axially extending S-shaped slit S, so as to provide, in its normal use, a gap having a uniform breadth on the surface as shown in FIG. 3. With this gap, the inner diameter of the cylindrical race member 3 can be reduced under the radially and inwardly directed stress exerted by the elastic cylindrical member 4 in which said cylindrical race member 3 is fitted, thereby applying preload onto the bearing. Furthermore, as the slit S of each of the cylindrical race members is formed in a generally S-shape, even a number of cylindrical race members 3 are stored in a container before they are assembled into bearing units, they are not caught in with one another via their slits so that before use, they can be easily taken out individually from the container.

When the present bearing is in operation, position of contact between the split and each of the needle-like rollers is progressively displaced along the length of the split and, therefore, it can be prevented that rolling of the needle-like rollers becomes disturbed due to the presence of the split.

The present invention, as having been so far explained in detail with reference to the accompanying drawings, can be modified and changed in construction within what is claimed in the appended claims, so far as it does not deviate from the concept of the present invention.

What is claimed is:

1. A bearing for interposition between the steering wheel shaft and steering wheel column of a vehicle, said bearing comprising a number of needle-like rollers, a retainer for retaining said needle-like rollers, a thin-walled cylindrical race member circumscribing said needle-like rollers, and an elastic cylindrical member fitted on said cylindrical race member and comprising a cylindrical portion positioned outwardly of said cylindrical race member and inwardly directed flange portions at the opposite ends of said cylindrical portion, which is characterized in that said cylindrical race member has a cylindrical shape with a C-shaped cross section as well as a generally S-shaped split formed along and extending the full axial length thereof with respect to the axis of said race.

2. The bearing as claimed in claim 1, wherein said generally S-shaped slit is so formed in said cylindrical race member that even when the facing opposite edges of the slit have been brought into abutting engagement, a narrow slit is still kept open at and along the intermediate portion of the slit.

* * * * *